United States Patent
Kumagai et al.

(10) Patent No.: US 7,564,488 B2
(45) Date of Patent: Jul. 21, 2009

(54) SURVEYING INSTRUMENT

(75) Inventors: Kaoru Kumagai, Itabashi-ku (JP);
Fumio Ohtomo, Itabashi-ku (JP);
Masaaki Kobayashi, Itabashi-ku (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 553 days.

(21) Appl. No.: 11/137,647

(22) Filed: May 25, 2005

(65) Prior Publication Data
US 2005/0275829 A1 Dec. 15, 2005

(30) Foreign Application Priority Data
Jun. 14, 2004 (JP) ............... 2004-175610

(51) Int. Cl.
*H04N 5/262* (2006.01)
*H04N 5/225* (2006.01)
*H04N 5/232* (2006.01)
*G01C 3/08* (2006.01)

(52) U.S. Cl. .................. 348/240.3; 348/207.99; 348/350; 356/4.01; 356/5.01

(58) Field of Classification Search ........... 348/207.99, 348/347, 240; 356/4.01, 5.01
See application file for complete search history.

(56) References Cited

U.S. PATENT DOCUMENTS

| 5,642,299 | A | 6/1997 | Hardin et al. ............ 364/561 |
|---|---|---|---|
| 6,504,602 | B1* | 1/2003 | Hinderling ............... 356/5.1 |
| 6,859,269 | B2 | 2/2005 | Ohtomo et al. .......... 356/141.1 |
| 2002/0018122 | A1* | 2/2002 | Marold et al. ............. 348/207 |
| 2002/0186361 | A1* | 12/2002 | Ueno et al. .............. 356/4.01 |
| 2003/0048355 | A1* | 3/2003 | Shimoyama et al. ......... 348/79 |
| 2003/0160886 | A1* | 8/2003 | Misawa et al. ............ 348/347 |

FOREIGN PATENT DOCUMENTS

| DE | 40 32 657 | 4/1992 |
|---|---|---|
| EP | 1 493 990 | 1/2005 |
| JP | 2003-279351 | 10/2003 |
| WO | 2004/044528 | 5/2004 |

OTHER PUBLICATIONS

Patent Abstracts of Japan vol. 1999, No. 9, Jul. 30, 1999.
Copy of European Search Report dated Sep. 20, 2005.

\* cited by examiner

*Primary Examiner*—Jason Chan
*Assistant Examiner*—Joel Fosselman
(74) *Attorney, Agent, or Firm*—Nields, Lemack & Frame, LLC

(57) ABSTRACT

A surveying instrument, comprising a first image pickup unit for obtaining a first image in a collimating direction, a second image pickup unit for obtaining a second image highly magnified than the first image pickup unit, a display unit for displaying the images obtained by the first image pickup unit and the second image pickup unit, and a control unit for magnifying and continuously displaying the first image and the second image on the display unit.

5 Claims, 6 Drawing Sheets

SURVEYING INSTRUMENT

BACKGROUND OF THE INVENTION

The present invention relates to a surveying instrument for performing light wave distance measurement by projecting a laser beam to an object to be measured. In particular, the present invention relates to a surveying instrument, which comprises a zooming function to continuously magnify an angle of view of a collimated image.

First, description will be given on a conventional type surveying instrument referring to FIG. 7.

FIG. 7 represents a surveying instrument main unit 1. The surveying instrument main unit 1 is installed on a tripod (not shown).

The surveying instrument main unit 1 primarily comprises a leveling unit 2 mounted on a tripod, a base unit 3 mounted on the leveling unit 2, a frame unit 4 mounted on the base unit 3 so that the frame unit 4 can be rotated horizontally around a vertical axis, and a telescope unit 5 mounted so that the telescope unit 5 can be rotated around a horizontal axis on the frame unit 4 in a top-to-bottom direction.

The frame unit 4 comprises a display unit 6, an operation unit 7, and a control unit provided inside (not shown), etc. The telescope unit 5 comprises a first telescope 8 which is a simple collimating telescope and a second telescope 9 which has fixed high magnification, which collimate an object to be measured. Further, the first telescope 8 and the second telescope 9 have optical axes running in parallel to each other. The second telescope 9 has high magnification. For example, magnification of the second telescope 9 is 30 times (30×).

On the telescope unit 5, there are provided a collimating optical system including the first telescope 8 and the second telescope 9 and a distance measuring optical system. After a collimating position (a measuring point) has been determined by the first telescope 8 and the second telescope 9, light wave distance measurement is performed via the distance measuring optical system.

In case the collimating position is to be determined, because the second telescope 9 has high magnification and has narrower visual field, a collimating direction is roughly determined by the first telescope 8, which has wider visual field. Further, the collimating position is determined by the second telescope 9.

In the conventional type surveying instrument, collimation is performed by the first telescope 8 which is a simple collimating telescope and the second telescope 9 which has fixed high magnification. When the collimating direction is determined or the object to be measured is collimated by the first telescope 8 and the collimating position is to be determined by the second telescope 9, magnification is very much different between the two telescopes. As a result, the collimating position or the object to be measured may be out of the visual field of the second telescope 9. In this case, the collimating direction must be adjusted again by the first telescope 8.

Or, when the collimating position is determined by the second telescope 9, it may be wanted sometimes to observe more closely around the collimating position. Because the second telescope 9 has fixed magnification, it is not possible to observe more closely than the visual recognition by the second telescope 9.

A zoom lens is used in optical instruments such as a camera, and the magnification can be changed without changing the collimating direction. However, when magnification is changed by the use of the zoom lens, the collimating position is moved within the visual field. In this respect, this is not adopted for a surveying instrument, which requires high accuracy.

A surveying instrument comprising the first telescope 8 and the second telescope 9 is disclosed in JP-A-2003-27935.

SUMMARY OF THE INVENTION

It is an object of the present invention to provide a surveying instrument, by which it is possible to perform digital zooming from low magnification to high magnification by using a digital image and to avoid deterioration of image quality due to digital zooming.

To attain the above object, the present invention provides a surveying instrument comprising a first image pickup unit for obtaining a first image in a collimating direction, a second image pickup unit for obtaining a second image highly magnified than the first image pickup unit, a display unit for displaying the images obtained by the first image pickup unit and the second image pickup unit, and a control unit for magnifying and continuously displaying the first image and the second image on the display unit. Also, the present invention provides the surveying instrument, wherein the images obtained by the first image pickup unit and the second image pickup unit are a first digital image and a second digital image respectively. Further, the present invention provides the surveying instrument, wherein the control unit magnifies and displays the first digital image up to magnification of the second image pickup unit, and the control unit magnifies and displays the second digital image when magnification of the image is more than the magnification of the second image pickup unit. Also, the present invention provides the surveying instrument, wherein the control unit continuously magnifies and displays the first digital image up to magnification of the second image pickup unit, and the control unit continuously magnifies and displays the second digital image when magnification of the image is more than the magnification of the second image pickup unit. Further, the present invention provides the surveying instrument, wherein the control unit magnifies and displays the first digital image stepwise up to magnification of the second image pickup unit, and the control unit magnifies and displays the second digital image stepwise when magnification of the image is more than the magnification of the second image pickup unit. Also, the present invention provides the surveying instrument, wherein the display unit comprises with a touch panel, and the control unit magnifies and displays the image around a position specified by the touch panel.

The present invention provides a surveying instrument, which comprises a first image pickup unit for obtaining a first image in a collimating direction, a second image pickup unit for obtaining a second image highly magnified than the first image pickup unit, a display unit for displaying the images obtained by the first image pickup unit and the second image pickup unit, and a control unit for magnifying and continuously displaying the first image and the second image on the display unit. As a result, it is possible to magnify an image without causing deviation of the collimating position. Also, magnifying is performed based on a plurality of acquired images having different magnification. Therefore, it is possible to perform zooming from lower magnification to higher magnification, and it is also possible to avoid the deterioration of image quality due to zooming.

The present invention provides a surveying instrument, wherein the control unit magnifies and displays a first digital image stepwise up to magnification of the second image pickup unit, and the control unit magnifies and displays the second digital image stepwise when magnification of the image is more than the magnification of the second image pickup unit. Thus, it is possible to attain the desired magnification in the range from lower magnification to higher magnification.

The present invention provides a surveying instrument, wherein the display unit comprises a touch panel, and the control unit magnifies and displays the image around a position specified by the touch panel. As a result, a magnified image in the required collimating direction can be obtained without accurately adjusting the collimating direction.

DETAILED DESCRIPTION OF THE PREFERRED EMBODIMENTS

Detailed description will be given below on the best mode of the invention for carrying out the present invention.

Figure 1:
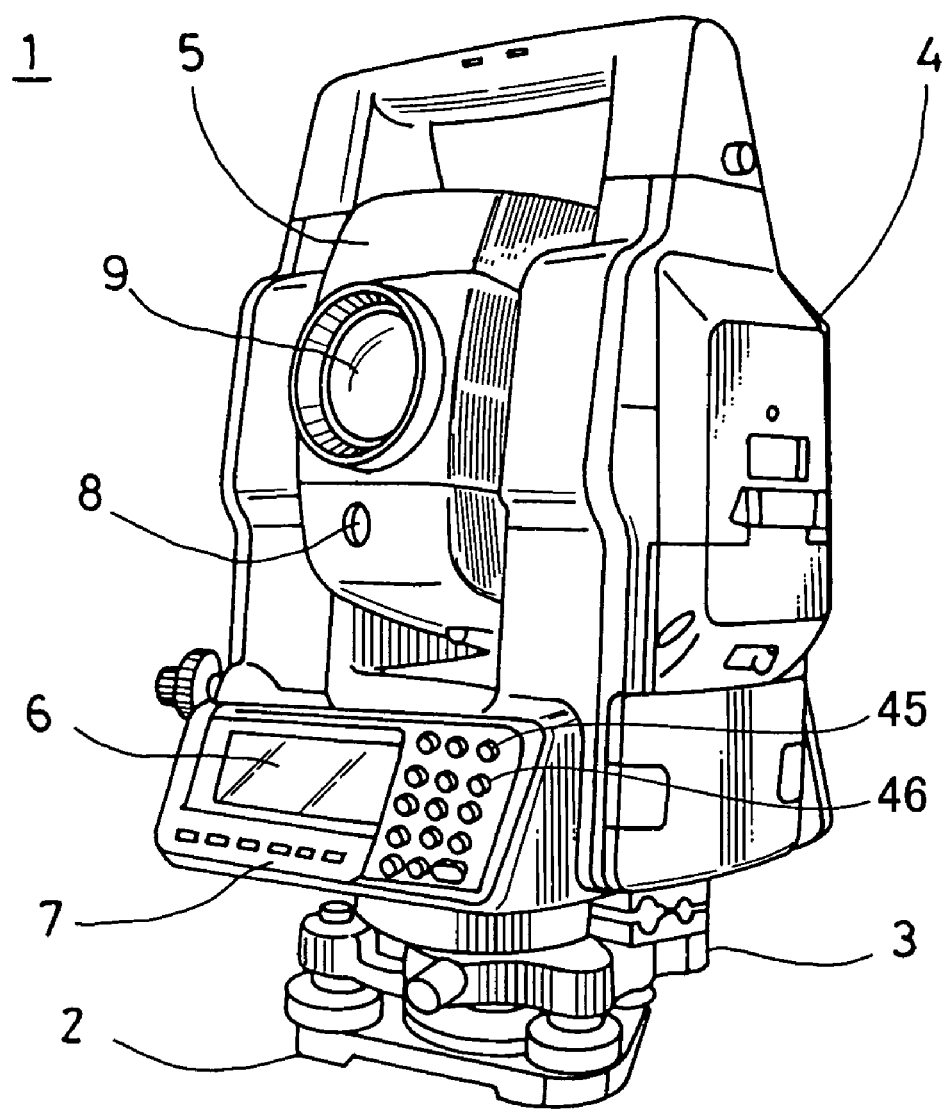
FIG. 1 is an external view of a surveying instrument main unit according to an embodiment of the present invention.
Figure 2:
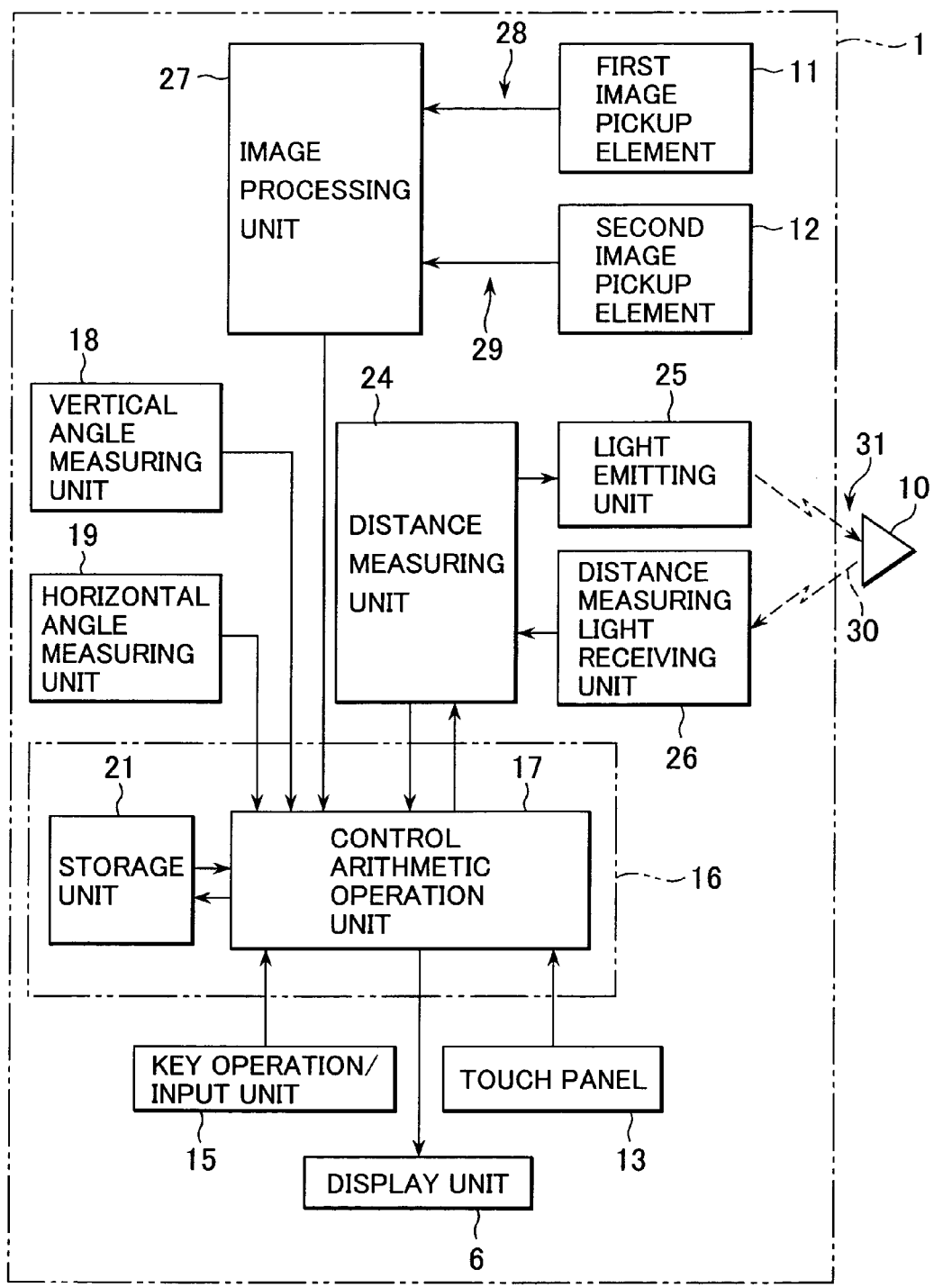
FIG. 2 is a schematical block diagram of a first embodiment of the present invention.
Figure 3:
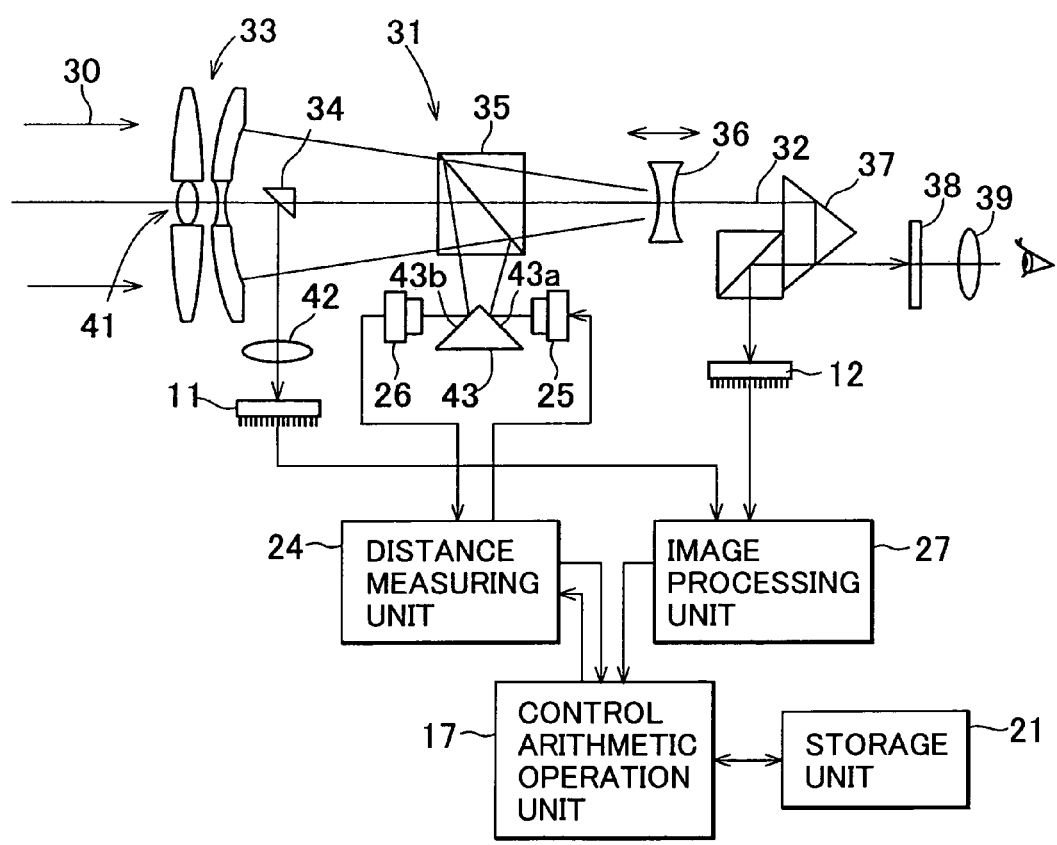
FIG. 3 is a schematical drawing of an optical system of the first embodiment of the present invention.

Referring to FIG. 1 to FIG. 3, description will be given on a first embodiment of the present invention.

Figure 7:
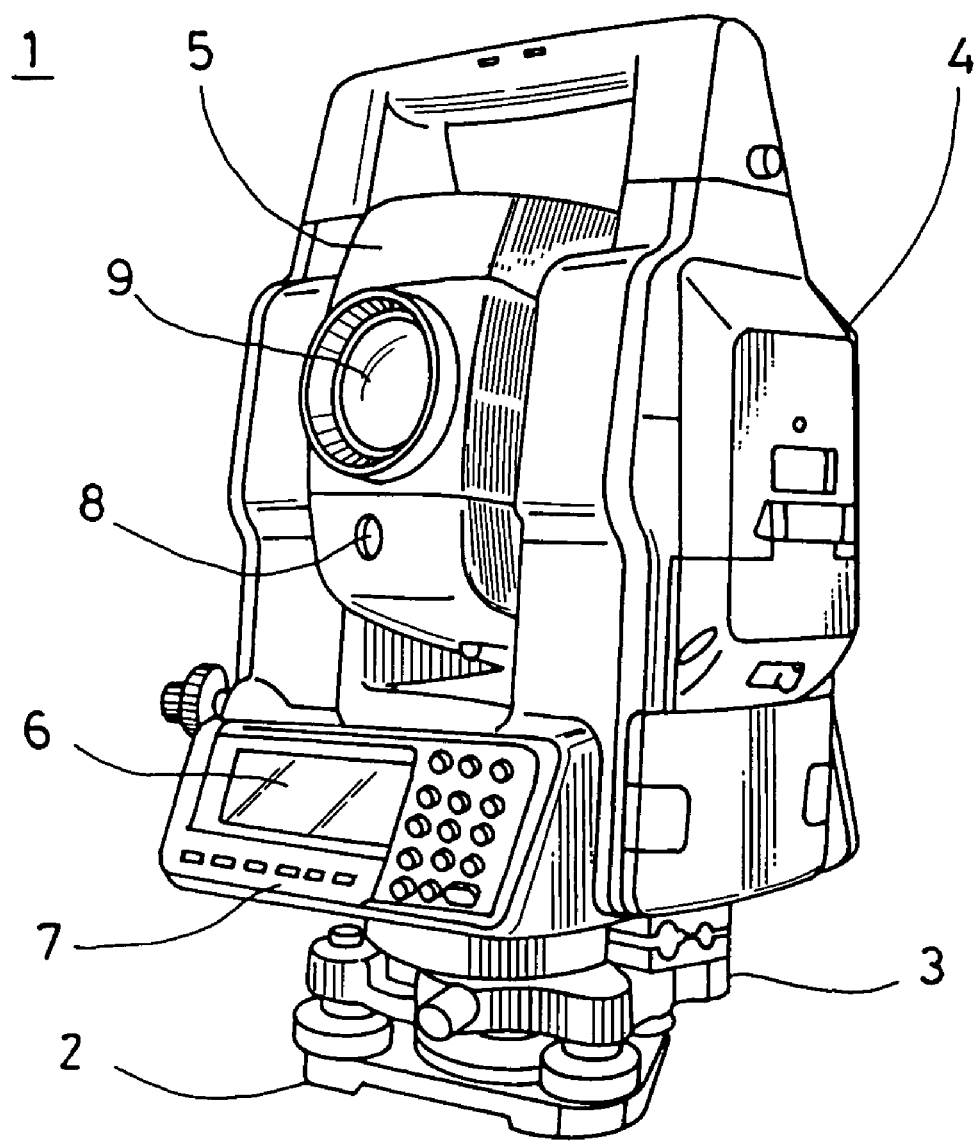
FIG. 7 is an external view of a conventional type surveying instrument main unit.

FIG. 1 represents an external view of a surveying instrument main unit 1 according to the present invention. Basic structure of the surveying instrument main unit 1 is the same as the surveying instrument main unit 1 shown in FIG. 7, and detailed description on the basic structure of the surveying instrument main unit 1 is not given here.

An operation unit 7 of the surveying instrument main unit 1 comprises a zoom switch 45 and a zoom changeover switch 46.

FIG. 2 shows general arrangement of a surveying instrument. In the figure, reference numeral 1 denotes the surveying instrument main unit, and reference numeral 10 denotes an object to be measured, e.g. a prism.

The surveying instrument main unit 1 primarily comprises a first image pickup element 11, a second image pickup element 12, a touch panel 13, a display unit 6, a key operation/input unit 15, a control arithmetic operation unit 17, a vertical angle measuring unit 18, a horizontal angle measuring unit 19, a storage unit 21, a distance measuring unit 24, a light emitting unit 25, a distance measuring light receiving unit 26, an image processing unit 27, and an optical system 31, etc. The control arithmetic operation unit 17, the storage unit 21, etc. make up together a control unit 16. The optical system 31, the first image pickup element 11, the second image pickup element 12, the image processing unit 27, etc. make up together an image pickup unit.

The touch panel 13 is provided on the display unit 6 so that a central position of magnification zooming (to be described later) can be indicated at a position where the touch panel 13 is touched. When a distance is measured, a surveying operator instructs, from the key operation/input unit 15, a measurement starting command, measuring conditions, etc., zooming operation and changing over of zoom magnification.

The image pickup unit comprises a first image pickup unit 28, which contains the optical system 31, the first image pickup element 11, etc., and a second image pickup unit 29, which contains the optical system 31, the second image pickup element 12, etc. The results of photodetection from the first image pickup element 11 and the second image pickup element 12 are respectively inputted to the image processing unit 27. Then, signal processing is performed to turn the results of photodetection to a digital image signal for each frame at the image processing unit 27. The image signal is stored in the storage unit 21 via the control arithmetic operation unit 17.

On the display unit 6, measuring conditions at the measurement, a measurement result, or an image taken in a collimating direction, or a result of image processing are displayed.

The control arithmetic operation unit 17 is a CPU, for instance. By the command form the key operation/input unit 15, the control arithmetic operation unit 17 carries out starting and execution of programs (to be described later), control and processing of signals, calculation, and driving and control, etc. of the display unit 6 and the distance measuring unit 24.

The control arithmetic operation unit 17 carries out calculation based on signals from the vertical angle measuring unit 18, the horizontal angle measuring unit 19 and the distance measuring unit 24, and measures a vertical angle, a horizontal angle, a distance, etc.

The each digital image signal inputted from the image processing unit 27 is associated with measurement data when the image signal is picked up, e.g. a vertical angle signal from the vertical angle measuring unit 18, a horizontal angle signal from the horizontal angle measuring unit 19, and a distance signal from the distance measuring unit 24. The results are stored in the storage unit 21, and the measurement data are accumulated. The data thus accumulated can be called out as a numerical value alone or together with the image.

With respect to association of each image signal with the measurement data, a recording area is prepared for each measuring point at the storage unit 21, and further, an image signal storage area and a measurement data storage area are prepared in the recording area. The image signal is associated with the measurement data for each measuring point, and the results are recorded. Or, an image signal storage area and a measurement data storage area are prepared in the storage unit 21. The image signal and the measurement data are separated from each other and are stored in the image signal storage area and the measurement data storage area respectively, and a management data to link the image data with the measurement data. Thus, association is performed by the above method or the like already known.

The vertical angle measuring unit 18 measures a vertical angle with respect to a horizontal line when the prism 10 is collimated by the optical system 31. The horizontal angle measuring unit 19 measures a horizontal angle of the prism 10 with respect to a reference direction when a predetermined direction is defined as the reference direction.

The distance measuring light receiving unit 26 receives a distance measuring light 30 reflected by the prism 10. Each of the first image pickup element 11 and the second image pickup element 12 is an image sensor, e.g. a photodetection element comprising an aggregate of a multiple of pixels such as a CCD, a CMOS sensor, etc. An address of each pixel (a position on the image pickup element) can be specified. An image obtained from a relay lens 41 (to be described later) is received by the first image pickup element 11, and an image obtained via the second telescope 9 is received by the second image pickup element 12, respectively.

In the storage unit 21, there are a sequence program, an image processing program, and a program for displaying image data on the storage unit 6, etc. The sequence program performs measurement. The image processing program performs image processing, e.g. magnifying or reducing in size of an image around an optical axis based on image signals from the first image pickup element 11 and the second image pickup element 12. As the storage unit 21, a semiconductor memory, etc. incorporated in the surveying instrument main unit 1 or various types of recording mediums, which are connectable to or removably mounted on the surveying instrument main unit 1 such as FD, CD, DVD, RAM, ROM, a hard disk, a memory card, etc. may be adopted.

The zoom switch 45 of the operation unit 7 is a switch for performing operation to magnify or to reduce in size of the image on the display unit 6. The image can be magnified or reduced in size with the collimating position fixed at a center of the display unit 6. The zoom changeover switch 46 can change the zoom magnification. In one selection, the zoom magnification is 1 to 30 times (1 to 30×). In another selection, the zoom magnification is 30 to 300 times (30 to 300×). The touch panel 13 can indicate the center of zoom on the touch panel. The collimating position is selected by a finger or by a touch pen from a display image on the display unit 6, and the image can be magnified and displayed with the selected collimating position at the center. In case the touch panel 13 is used, there is no need to correct the collimating position by using the telescope 8.

FIG. 3 shows an optical system of a surveying instrument according to the first embodiment of the invention.

An objective lens 33, a reflection mirror 34, a dichroic mirror 35, a focusing lens 36, and an erect image prism 37 are arranged on an optical axis 32.

The objective lens 33 is designed as an aperture lens, and the relay lens 41 is arranged so that an optical axis of the relay lens 41 is aligned with the optical axis 32 at the aperture of the objective lens 33.

A relay lens 42 and the first image pickup element 11 are arranged on a reflection light optical axis of the reflection mirror 34. The first image pickup element 11 sends the result of photodetection to the image processing unit 27 as an image signal by collecting pixel signals of individual pixels.

The dichroic mirror 35 is an optical element, which reflects the distance measuring light 30 and allows natural light to pass. On the reflection light optical axis of the dichroic mirror 35, a reflection prism 43 is disposed. The reflection prism 43 has two reflection surfaces 43a and 43b running perpendicularly to each other. The light emitting unit 25 is arranged to face to the reflection surface 43a, and the distance measuring light receiving unit 26 is arranged to face to the reflection surface 43b. The light emitting unit 25 is driven by the distance measuring unit 24 and emits light. The light emitting unit 25 emits the distance measuring light 30, preferably a light with a wavelength different from a wavelength of natural light, e.g. an infrared light.

The distance measuring light 30 is reflected by the reflection surface 43a and the dichroic mirror 35, and the distance measuring light 30 is turned to a parallel luminous flux by the objective lens 33 and is projected toward the prism 10. After being reflected by the prism 10 and converged by the objective lens 33, the distance measuring light 30 is reflected by the dichroic mirror 35 and is received by the distance measuring light receiving unit 26. The distance measuring light receiving unit 26 sends a photodetection signal to the distance measuring unit 24.

At the distance measuring unit 24, a distance to the prism 10 is measured based on a result of photodetection of the distance measuring light 30 by the distance measuring light receiving unit 26 and based on a result of photodetection of internal reference light (not shown). The result of the measurement is sent to the control arithmetic operation unit 17.

The erect image prism 37 has a plurality of reflection surfaces and projects an incident inverted image as an erect image. At least one of the reflection surfaces is designed as a half-mirror. The natural light entering from the objective lens 33 passes through the dichroic mirror 35 and enters the erect image prism 37. The erect image prism 37 projects an image of the prism 10 as an erect image. Also, a part of the incident light is split and separated and is projected.

By adjusting the focusing lens 36 along the optical axis 32, an erect image is formed on a reticle 38, and the image on the reticle 38 can be recognized by a measuring operator via an ocular lens 39. The part of the incident light thus split forms an image on the second image pickup element 12. The second image pickup element 12 sends the photodetection result as an image signal by collecting pixel signals of individual pixels to the image processing unit 27.

The image processing unit 27 performs conversion and processing, etc. of the image signal from the first image pickup element 11 and the image signal from the second image pickup element 12 to digital image signals or the like. The image processing unit 27 sends the digital image signals to the control arithmetic operation unit 17. The control arithmetic operation unit 17 stores the digital image data signal thus sent out to the storage unit 21.

The relay lens 41, the reflection mirror 34, and the relay lens 42 make up together a first collimating optical system. The first collimating optical system and the first image pickup element 11 make up together the first image pickup unit 28. Optical magnification of the first collimating optical system is 1 time (1×), for instance. The objective lens 33, the focusing lens 36, and the erect image prism 37 make up together a second collimating optical system, and the second collimating optical system and the second image pickup element 12 make up together the second image pickup unit 29. Optical magnification of the second collimating optical system is 30 times (30×), for instance.

Description will be given below on operation.

The prism 10 is installed at a measuring position. By operating a key as required on the operation unit 7, power is turned on to the surveying instrument main unit 1. The prism 10 is collimated by the first telescope 8, and the prism 10 is adjusted to align with a center of a visual field. Or, the collimating direction may be roughly determined by the first telescope 8.

An image formed on the first image pickup element 11 via the relay lens 41 and the relay lens 42 is displayed on the display unit 6, and the image is stored at the storage unit 21 via the image processing unit 27 and the control arithmetic operation unit 17.

When it is wanted to magnify an image of the display unit 6, the zoom switch 45 on the operation unit 7 is operated. A signal from the zoom switch 45 is inputted to the control arithmetic operation unit 17. The control arithmetic operation unit 17 starts and executes the image processing program. From the image data stored in the storage unit 21, an area around the optical axis and corresponding to the magnification is cut off, and the image is magnified and displayed on the display unit 6. Magnification is set to 1 to 30 times (1 to 30×), for instance.

In case a magnifying center is indicated by using the touch panel 13, an image around the indicated position is magnified and displayed on the display unit 6. Therefore, when the touch panel 13 is used, collimation by the first telescope 8 may be carried out roughly.

The image displayed on the display unit 6 is always magnified around the optical axis or around the indicated position. Thus, no deviation occurs from the displayed collimating direction or from the center of the image.

Based on the magnified image, it is possible to judge whether or not the collimating direction is directed toward the object to be measured (the prism 10). If there is any difference, the collimating direction is corrected while watching the image. After the correction, it is confirmed whether or not the collimating direction is directed toward the prism 10 by the second telescope 9. The optical axis of the first telescope 8 is running in parallel to the optical axis of the second telescope 9, and the optical axis of the first telescope 8 is running closer to the optical axis of the second telescope 9. By aligning the collimating direction on the first telescope 8, the collimating direction by the second telescope 9 can be corrected.

An image obtained by the second telescope 9 is projected to the second image pickup element 12 via the erect image prism 37, and an image formed on the second image pickup element 12 is stored in the storage unit 21 via the image processing unit 27 and the control arithmetic operation unit 17. The image received at the second image pickup element 12 is displayed on the display unit 6.

When an image magnified by more than 30 times is to be displayed, the zoom changeover switch 46 is changed over, and zoom magnification is changed.

The zoom switch 45 on the operation unit 7 is operated. The image processing program is started and executed. From the image data stored in the storage unit 21, an area around the optical axis and corresponding to the magnification is cut off, and the image is magnified and displayed on the display unit 6. An image magnified by 30 to 300 times (30 to 300×) is displayed on the display unit 6. As described above, the image displayed on the display unit 6 is always magnified around the optical axis. Thus, no deviation occurs on the collimating position even when the image displayed is magnified at high magnification.

Figure 4:
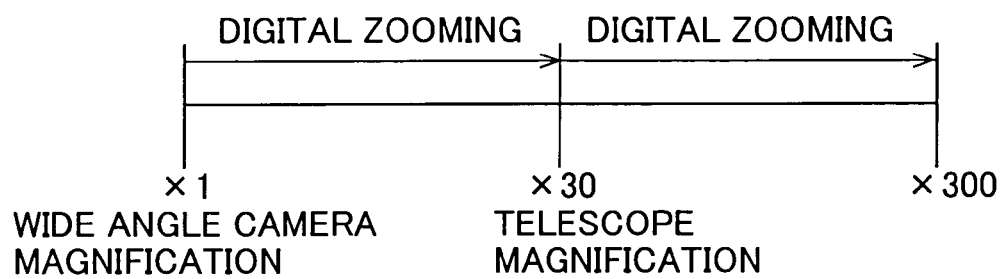
FIG. 4 is a drawing to illustrate an aspect of a digital zoom in the first embodiment of the present invention.
Figure 5:
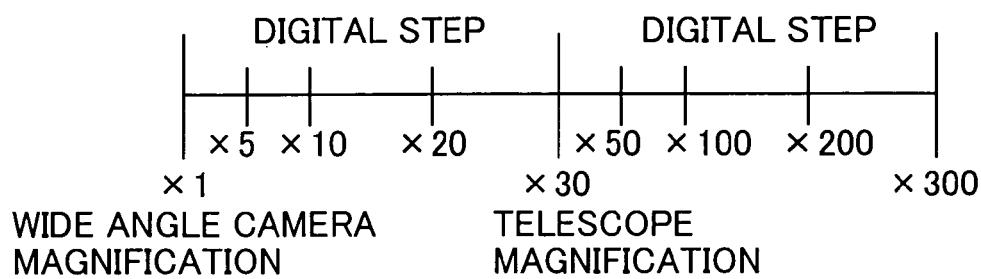
FIG. 5 is a drawing to illustrate an aspect of a digital zoom in the first embodiment of the present invention.

When an image is magnified, an image may be continuously magnified as shown in FIG. 4 or an image may be magnified stepwise as shown in FIG. 5. In any case, it is digital zooming based on the processing of digital image signals, and a magnified image in any size can be obtained. For the zooming of 30 times or more, the deterioration of image quality can be avoided because the image obtained by the second image pickup unit 29 is magnified.

Figure 6:
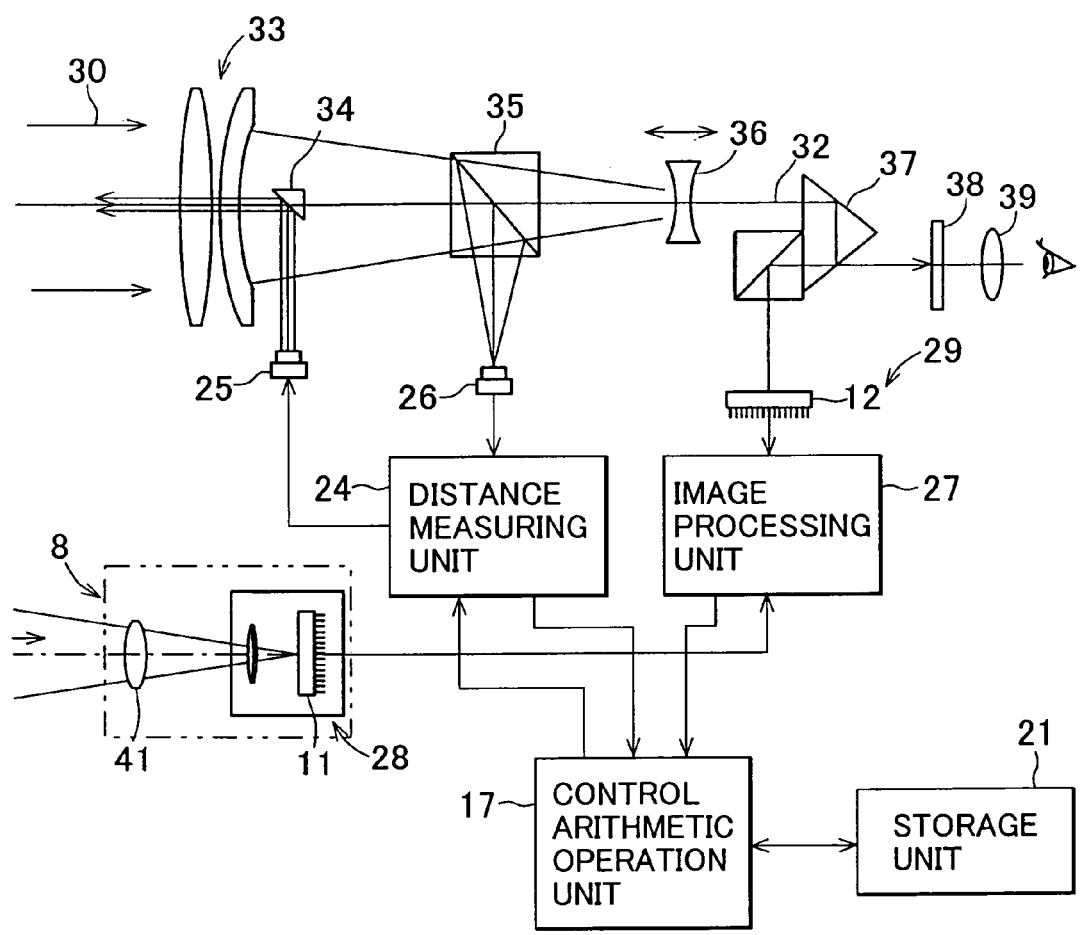
FIG. 6 is a schematical drawing of an optical system of a second embodiment of the present invention.

FIG. 6 represents a second embodiment of the invention. In this second embodiment, the optical system of the first image pickup unit 28 is separately constructed from the optical system of the second image pickup unit 29, and the optical system of the first image pickup unit 28 is commonly used with the first telescope 8.

In FIG. 6, the same component as shown in FIG. 3 is referred by the same symbol.

The light emitting unit 25 is arranged on a reflection light optical axis of the reflection mirror 34, and the distance measuring light receiving unit 26 is arranged on a reflection light optical axis of the dichroic mirror 35. The distance measuring light 30 reflected by the prism 10 and converged by the objective lens 33 is reflected by the dichroic mirror 35 and is received by the distance measuring light receiving unit 26. The distance measuring light receiving unit 26 sends a photodetection signal to the distance measuring unit 24.

Natural light from the prism 10 passes through the dichroic mirror 35 and enters the erect image prism 37. By adjusting the focusing lens 36 along the optical axis 32, an erect image is formed on the reticle 38. The image on the reticle 38 can be visually recognized by a measuring operator via the ocular lens 39. The split part of the incident light forms an image on the second image pickup element 12. The second image pickup element 12 turns the photodetection result to an image signal by collecting pixel signals of individual pixels and sends the image signal to the image processing unit 27.

An image obtained through the telescope 8 is formed on the first image pickup element 11 via the relay lens 41. The first image pickup element 11 turns the photodetection result to an image signal by collecting pixel signals of individual pixels and sends the image signal to the image processing unit 27.

The image processing unit 27 performs conversion and processing, etc. of the image signal from the first image pickup element 11 and the image signal from the second image pickup element 12 to a digital image signal or the like and sends the digital image signal to the control arithmetic operation unit 17. The control arithmetic operation unit 17 stores the digital image data signal thus sent out to the storage unit 21.

The operation in the second embodiment is the same as the operation of the first embodiment, and detailed description is not given here.

What is claimed is:

1. A surveying instrument, comprising a first image pickup unit for obtaining a first image of an object to be measured in a collimating direction, a second image pickup unit which has a higher magnification as compared to said first pickup unit and obtains a second image at a higher magnification as compared to said first image, a display unit which has a touch panel and displays the images obtained by said first image pickup unit and said second image pickup unit, a distance measuring optical system for projecting a distance measuring light to said object to be measured and for receiving a reflection light from said object to be measured, a collimating optical system in which said object to be measured can be observed via an objective lens, an erected image prism and an ocular lens, and a control unit for magnifying and displaying the first image and the second image on said display unit, wherein an optical axis of said distance measuring optical system, an optical axis of said collimating optical system, and an optical axis of said second image pickup unit are coaxial in part, and said second image pickup unit receives a luminous flux from said object to be measured via said erect image prism, wherein the images obtained by said first image pickup unit and said second image pickup unit are a first digital image and a second digital image respectively, wherein said control unit sets a position instructed by said touch panel as a collimating point and displays said first digital image and said second digital image with the collimating point as a center, at a desired magnification up to the magnification of said second image pickup unit, said control unit is adapted to magnify and to display said first digital image, and at a desired magnification above the magnification of said second digital image pickup unit, said control unit is adapted to magnify and to display said second image.

2. A surveying instrument according to claim 1, wherein said control unit continuously magnifies and displays the first digital image up to magnification of said second image pickup unit, and said control unit continuously magnifies and displays the second digital image when magnification of the image is more than the magnification of said second image pickup unit.

3. A surveying instrument according to claim 1, wherein said control unit magnifies and displays the first digital image stepwise up to magnification of said second image pickup unit, and said control unit magnifies and displays the second digital image stepwise when magnification of the image is more than the magnification of said second image pickup unit.

4. A surveying instrument according to claim 1, wherein an optical system of said first image pickup unit receives a luminous flux near said optical axis, and an optical axis of said second image pickup unit receives a luminous flux around said optical system of said first image pickup unit.

5. A surveying instrument according to claim 1, wherein a part of an optical axis of said first image pickup unit is coaxial with said optical axis of said distance measuring optical system, said optical axis of said collimating optical system, and said optical axis of said second image pickup unit.

* * * * *